3,356,837
BINARY DATA INFORMATION HANDLING SYSTEMS
Francois Henri Raymond, Saint-Germain-en-Laye, France, assignor to Societe d'Electronique et d'Automatisme, Courbevoie, Seine, France
Filed Jan. 7, 1964, Ser. No. 336,224
Claims priority, application France, Jan. 11, 1963, 921,152, Patent 1,353,029; Jan. 7, 1964, 959,560, Patent 85,070
8 Claims. (Cl. 235—153)

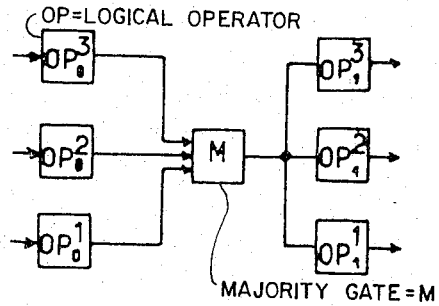
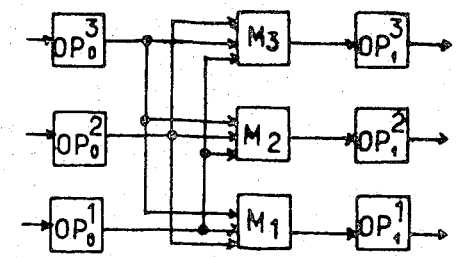
FIG. 1  FIG. 2
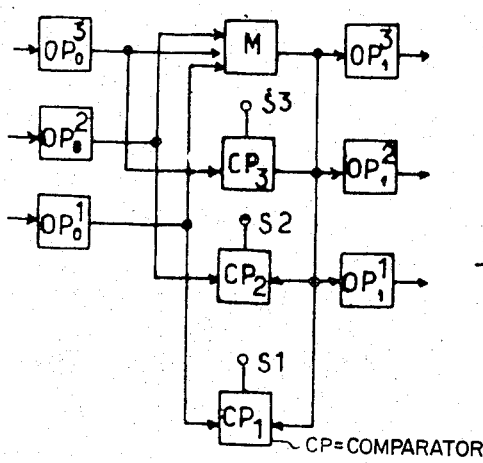
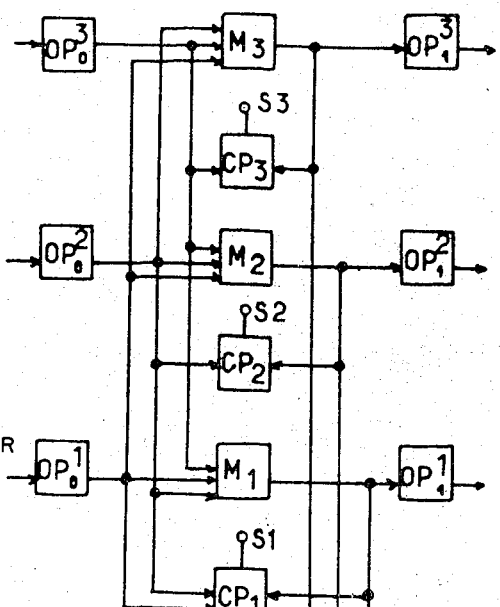
FIG. 3  FIG. 4
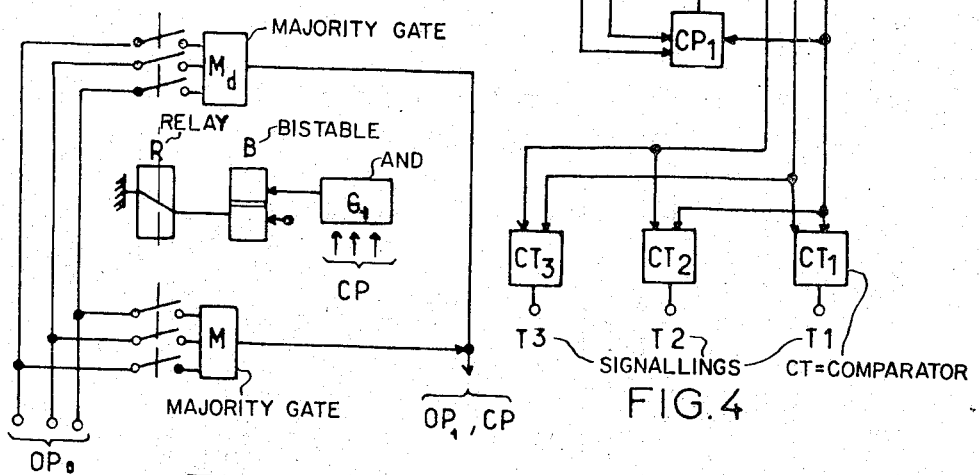
FIG. 3A United States Patent Office 3,356,837
Patented Dec. 5, 1967

ABSTRACT OF THE DISCLOSURE

An information handling system for processing binary data items is disclosed by this specification. The system includes, in part, first and second stages of triplicated operators operatively connected together through and by a majority gate circuit. Comparator means are operatively connected to the described system, and they are constructed and arranged to deliver signals indicative of a dissenting vote output in an operator of said first stage. The comparator means may be fed with combinations of outputs from the operators of the first stage for the purpose of registering or using a dissenting vote signal. In the alternative, they may be fed with the output information from said operators and the output from said majority gate arrangement.

---

The present invention concerns improvements in or relating to binary data information handling systems of the type that are generally constituted by cascaded logic and/or numerical operators for computing and processing information items, and which are interconnected according to any required diagram.

For increasing the reliability of operation of such systems, the prior art has taught redundant systems where at least some of the operator stages are triplicated, and the transmission of any item of information outputted from said triplicated operators to a next succeeding stage in the cascade arrangement is made through a majority function forming circuit. The majority function has been defined by Von Neumann in his book entitled: "Automation Studies," published in 1956 by the Princeton University Press as being the result of the following logic formulation:

(i) $\quad M = Z_1.Z_2 + Z_2.Z_3 + Z_3.Z_1$ where $Z_1$, $Z_2$, and $Z_3$ are binary data variable items, and where the resulting item M is always of the value presented by at least two of the said variable items Z.

For utilization in a binary data information handling system, the majority forming function may be accomplished either in a single majority function forming circuit M, as shown in FIG. 1, the three inputs of which are connected to the three outputs of the operators $OP_o^1$, $OP_o^2$, $OP_o^3$ of a first triplicated operator stage. The output of the circuit M may be connected, as in the usual case to the three inputs of, the second stage of triplicated operators comprising the operators $OP_1^1$, $OP_1^2$, $OP_1^3$. The three operators of the first stage are made identical and receive the same information items on their inputs. If one of said first operators becomes defective, the output of M is still the majority vote of the three operators, such that the second stage of operators receives the correct item value. The defective operator may be removed and repaired without impeding the operation of the complete system. However, when M becomes defective, the complete system becomes defective. For this reason, it seems preferable in some cases to provide, as shown in FIG. 2, three majority function forming circuits, $M_1$, $M_2$ and $M_3$ for connecting the triplicated operators in the successive stages. Each majority circuit receives the three outputs of the first stage operators, and each of the said majority circuits has its output connected to a distinct one of the operators of the next or second stage of operators. With such an arrangement a default in an operator leaves the system operative on two paths, and further, a defective majority function forming circuit also leaves the system operative on two information handling paths. The defective operator and or the defective majority circuit may be repaired without disturbing in the system.

However, the prior art has not provided effective means for automatically determining the defective component circuits in the stated reliability systems. According to the present invention, in its various embodiments, the majority function forming circuits are combined with further circuits which provides a permanent check and indicate such defects or otherwise respond to same, by comparing signals where one of the signal compared issues from one of the operators of a stage at least one output of which is connected to a majority function forming circuit.

For explaining the invention, reference is made to the accompanying drawings, wherein: in addition to the above-described FIGS. 1 and 2;

FIG. 3 shows an arrangement according to the invention as applied to a system of the kind of FIG. 1;

FIG. 3A is a modification of the embodiment of FIG. 3, showing a partial view embodying means for automatically substituting an operative majority function forming circuit for a defective one;

FIG. 4 shows an arrangement according to the invention as applied to a system of the kind of FIG. 2;

Figures 5, 7:
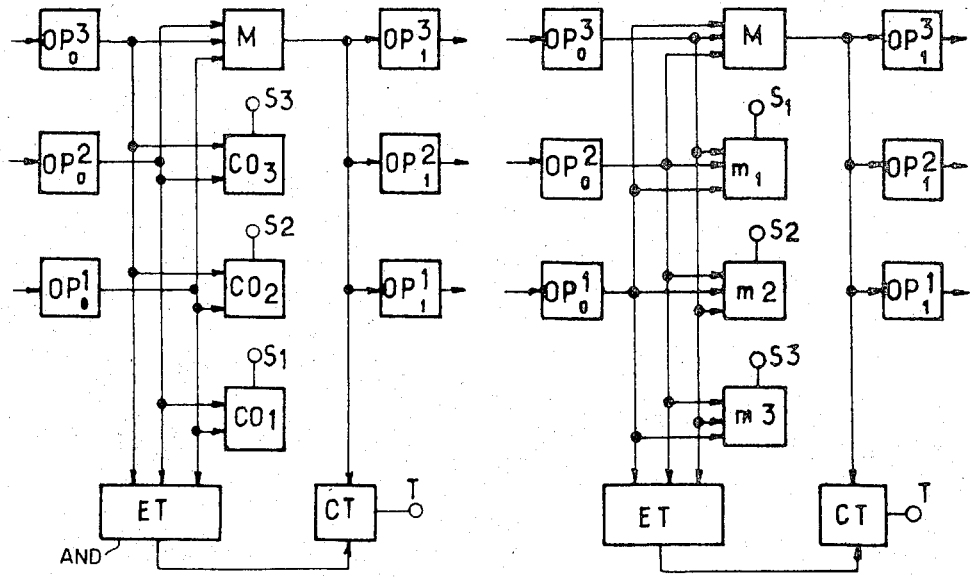
FIG. 5 shows a modification of the arrangement of FIG. 3, and FIG. 6, a modification of the arrangement of FIG. 4, with a different type of signal comparator.
Figures 6, 8:
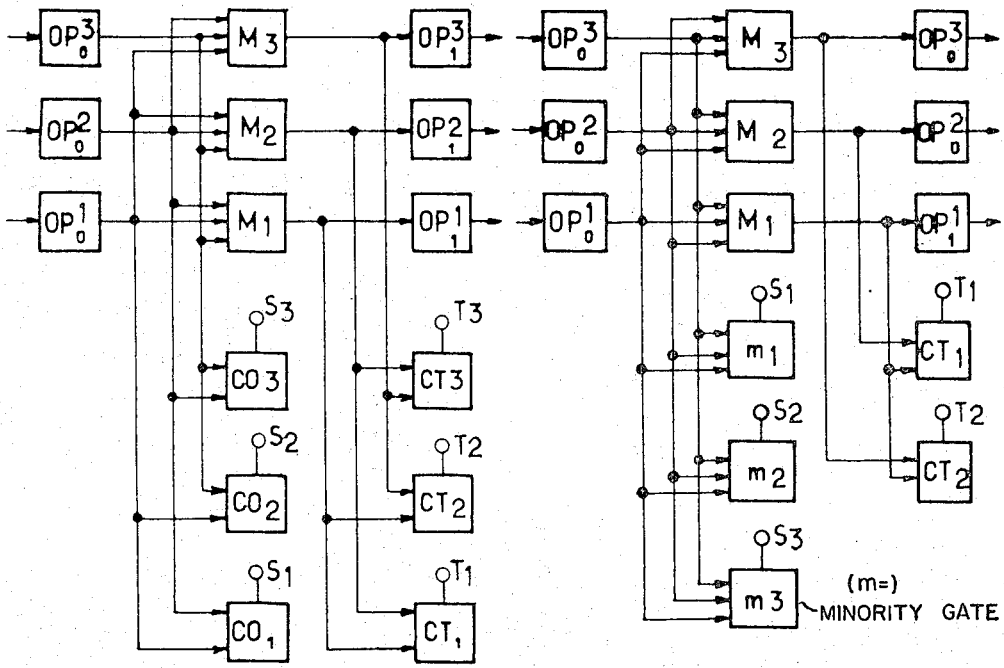
Figure 9:
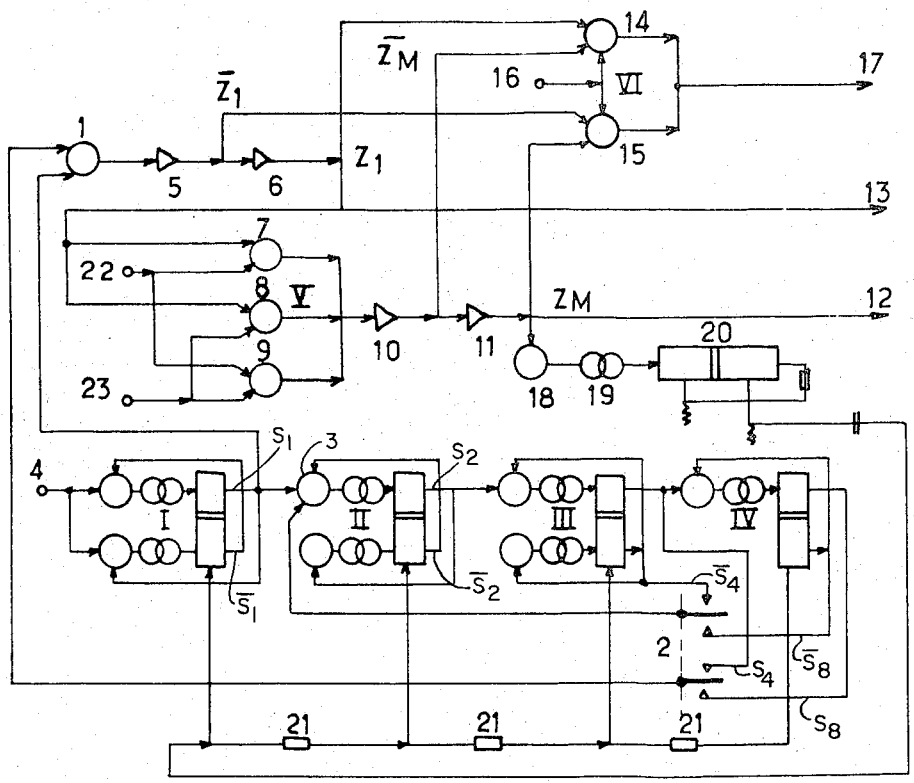
Figure 10:
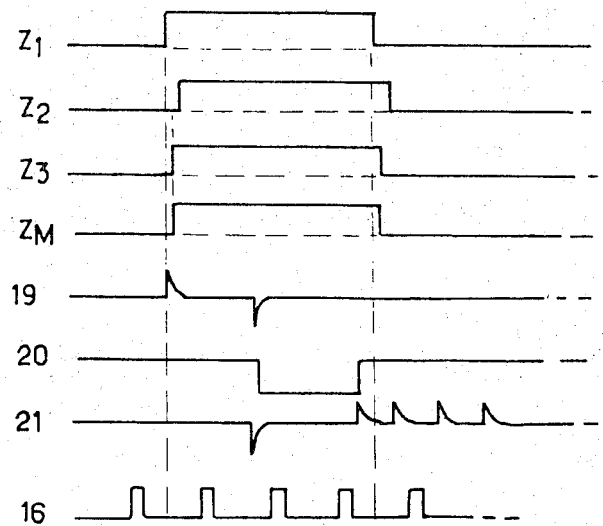

FIGS. 7 and 8 respectively show further modifications of FIGS. 3 and 4 with another type of comparator;

FIG. 9 shows a more detailed embodiment illustrative of the application of the invention for an operator comprising a binary counter; and FIG. 10 shows the wave-form at various points in the circuit.

In the arrangements of FIGS. 3 to 6, inclusive, use is made of a comparator circuit, i.e. a circuit performing a logical operation of identity or, with the same end, a restrictive-OR operation. Such a circuit receives two input signals and delivers an output signal each time the binary values of the input signals are different, one being a binary digit 1 and the other a binary digit 0; this is an operator fulfilling an exclusive-OR operation. When such an operator is followed by a complementary member, the operator becomes an identity function operator. Such logic circuits are well known in the art. Their logical functions are:

(ii) $\quad S = Z_1.\bar{Z}_2 + \bar{Z}_1.Z_2$ (restrictive-OR)

and (iii) $\quad \bar{S} = Z_1.\bar{Z}_2 + \bar{Z}_1.Z_2$ (identity)

with $Z_1$ and $Z_2$ as the two input signals, S the direct or plain output, and $\bar{S}$ the complementary output.

Referring to FIG. 3, each one of the operators $OP_o^1$, $OP_o^2$, $OP_o^3$ of the first stage has an output applied to a corresponding input of the majority function forming circuit M and the output of M is applied to an input of each one of the operators $OP_1^1$, $OP_1^2$, $OP_1^3$ of the second stage. An output of each one of the operators $OP_o$ is also connected to a corresponding input of a respective comparator $CP_1$, $CP_2$, $CP_3$. The other inputs of comparator receive the signal issuing from M. When a comparator receives two signals of different binary values, it delivers an output signal to thereby turn-on a corresponding signalling lamp, $S_1$ for $CP_1$, $S_2$ for $CP_2$ and $S_3$ for $CP_3$. Each of the said signalling outputs include a memory circuit, such as a bistable circuit, so that when one of the said bistable circuits is activated correspanding lamp remains turned on. If, for example $S_1$ is on, it is because the output signal from $OP_o^1$ differs from the majority signal issuing from M. Consequently, $OP_o^1$ is defective (or the signals applied to it). The same is true of $S_2$ and $S_3$ when they are on. When all three lamps are on the signalling circuits indicate that the majority function forming circuit M is defective since they show that the output signal supplied by M is different from the identical signals from the operators $OP_o$. In such an arrangement, this indication may be used to automaticaly switch out the defective circuit M and automaticaly switch in an operative circuit $M_d$ as shown in the partial view of FIG. 3A. The connections between the outputs of the operators $OP_o$ and the inputs of M pass through normally closed contacts of a relay R and are also directed to normally open contacts of said relay R. The latter named contacts are connected to the circuit $M_d$ which is automaticaly substituted for M in case the latter fails. The outputs of M and $M_d$ are connected in common to the inputs of the operators $OP_1$ and the comparators CP. The outputs of the comparators are applied to an AND-circuit or gate $G_1$ the output of which is connected to the input of a bistable circuit B to activate same when a signal is applied by the gate. When B is activated, it in turn activates the relay R so that the circuit is transferred from M to $M_d$, which occurs as previously stated, when the three outputs of the comparators $CP_1$, $CP_2$ and $CP_3$, are activated, in response to a default or a failure of the majority function forming circuit M. Of course, the relay and contacts thereof may be made entirely electronic if desired. The bistable element B may light a signalling lamp simultaneously to the activation of the relay R.

An alternative embodiment employing comparators in systems having three majority function forming circuits as interstage links is shown in FIG. 4. Each one of the comparators CP receives the output signal from one of the operators $OP_o$ and the output signal from the corresponding circuit M of idential index for example, $CP_1$ compare the signals from $OP_o^1$ and $M_1$, $CP_2$ the signals from $OP_o^2$ and $M_2$, and $CP_3$ the signals from $OP_o^3$ and $M_3$.

As shown in FIGURE 4, additional comparators $CT_1$, $CT_2$, and $CT_3$ are operatively connected to the majority function forming circuits and to signalling lamps or circuits comprising $T_1$, $T_2$ and $T_3$ respectively. The comparators CP are provided in order that the failure of any of the circuits M may be indicated should any of the said circuits malfunction. As shown $CT_1$ is connected to receive the outputs of $M_1$ and $M_2$; $CT_2$ receives the outputs of $M_1$ and $M_3$; and $CT_3$ receives the outputs of $M_2$ and $M_3$. Accordingly when any two of the lamps or lamp circuits $T_1$, $T_2$, and $T_3$ are lighted an indication of malfunctioning of the circuit M that is operatively connected through the respective comparators CT to the turned-on lamps is provided. In the alternative, one of the comparators CT may be omitted, for example, the circuit may be altered by eliminating $CT_3$. In such a case, if both $T_1$ and $T_2$ are on then the indicated failure is in $M_1$. Similarly if $T_1$ is the sole lamp on then the failure indicated is in $M_2$, and if $T_2$ is the sole lamp on when the failure indicated is in $M_3$.

A modification is shown in FIG. 5 for a single majority function forming member M system, and in FIG. 6 for a triple majority function forming member M system. The modification consists of comparing the outputs of the operators $OP_o$ in groups of two in comparators CO instead of comparing the individual comparator outputs to the output(s) of the majority function forming circuit(s). For example, $CO_1$ compares the outputs of $OP_o^1$ and $OP_o^2$; $CO_2$ compares the outputs of $OP_o^2$ and $OP_o^3$; and $CO_3$ compares the outputs of $OP_o^3$ and $OP_o^1$. When the three outputs are identical, none of the lamps $S_1$, $S_2$ and $S_3$ are lighted. When the output signal from $OP_o^1$ differs from the two others, lamps $S_1$ and $S_2$ are turned on displaying a failure of $OP_o^1$; when the operator $OP_o^2$ fails, lamps $S_1$ and $S_3$ will light; and when the operator $OP_o^3$ fails, lamps $S_2$ and $S_3$ will be turned-on. Here again, one of the comparators may be omitted, e.g., $CO_3$. In such a case simultaneous illumination of lamps $S_1$ and $S_2$ will indicate the failure of $OP_o^1$, whereas the illumination of lamp $S_1$ alone will indicate the failure of $OP_o^2$ and the illumination of lamp $S_2$ alone will indicate the failure of $OP_o^3$.

In FIG. 5, the detection of a failure of M may be accomplished by comparing the AND signal from a circuit ET which receives the outputs of the operators $OP_o$ to the output of the circuit M in a comparator CT which is operatively connected to a signalling lamp or circuit T. If the lamps S are off and T is on, the circuit indicates a failure of M. The circuit shown in FIGURE 6 is the modification of the circuit of FIGURE 5 required where the voting circuits are triplicated.

One of the comparators CO and one of the comparators CT, in FIGURE 6 may be omitted if desired.

Another modification of the comparators for displaying the failure of an operator $OP_o$ is shown in FIGS. 7 and 8, respectively for the single and the triple majority circuit systems. This third alternative is based on what may be called the "minority forming" circuits $m_1$, $m_2$, $m_3$ respectively defined by the relations:

(iv) $\quad m_1 = Z_1.\bar{Z}_2.\bar{Z}_3 + \bar{Z}_1.Z_2.Z_3$ (v) $\quad m_2 = \bar{Z}_1.Z_2.\bar{Z}_3 + Z_1.\bar{Z}_2.Z_3$ (vi) $\quad m_3 = \bar{Z}_1.\bar{Z}_2.Z_3 + Z_1.Z_2.\bar{Z}_3$ the first of which relates to $Z_1$ different from $Z_2$ and $Z_3$, the second to $Z_2$ different from $Z_1$ and $Z_3$ and the third to $Z_3$ different from $Z_1$ and $Z_2$.

From the above given relations, as well as the relations previously described for the majority function forming circuits and the comparator circuits, it is believed that the operation of the embodiments disclosed by FIGURES 7 and 8 will be obvious to those skilled in the art in that they are based on union (OR operation) of intersections (AND operation). The minority forming circuits $m_1$, $m_2$ and $m_3$ are operatively connected to the operators $OP_o$ to fulfill their above defined functions and they are operatively associated with the signalling lamps or circuits $S_1$, $S_2$ and $S_3$, respectively to signal the failure of the said operators.

Although each of the embodiments disclosed by FIGURE 3 through FIGURE 8 of the drawings show systems for indicating the failure of operators and/or majority voter circuits the said signalling system may be used for a group of stages and sequentially and permanently switched from one stage to the next stage of the group by means of a sequence switch which automatically connects the inputs of the signalling comparators and lamp circuits to the outputs of the stages in the concerned group. For example, the operators $OP_1$ may be connected through a second majority voter circuit to a third stage of operators and the third stage of operators may in a like manner be connected to a fourth stage through a subsequent majority voter circuit. By using a sequencing switch the comparators and signalling lamps may be switched to test the operability of each of cascaded stages of operators and in addition the switch may be set to stop the sequencing of the signalling circuits upon the detection of a failure during the test operation.

According to an additional feature of the invention a majority signal may be further used as a resetting signal to condition the operators from which it has been formed in order to further enhance the reliability of the system. Such a resetting of the condition of the operators prior to the arrival of the next item signals on their inputs either may re-established their condition of operation as correct or definitely confirm their failure. Such a resetting may be provided in all cases where the operator circuit proper operates between at least the two conditions of "set" and "reset," or it operates between several conditions of "setting" with respect to a single condition of "resetting." A typical example of such an arrangement is shown in FIG. 9, wherein the operator consists of a pulse counter.

FIG. 9 shows one of the three operators of a stage together with a majority function forming circuit and the comparator circuit thereof. Said operator comprises four bistable circuits I to IV, each having associated input circuits including gates and driving pulse transformers for activating the bistable inputs. The bistable circuits I to III are of the flip-flop type. Each of the inputs to each flip-flop is a gate transformer. The bistable circuit IV only requires a single pulse gate transformer input. The circuits are connected in a cascade where the first flip-flop in the chain receives pulses from a previous operator at an input terminal 4. The routing of any pulse to the proper input terminal to activate a bistable device is made with feedback connections from the outputs of the said device. The feedback connections are cross-connected from one output to the opposite input. The bistable device outputs marking the binary digit 1 are numbered $s_1$ to $s_8$ respectively for stages I to IV and the outputs marking the digit 0 are referred to as $\bar{s}_1$ to $\bar{s}_8$, as being complementary to the first ones.

The operator may be made as a ten digit counter counting from zero to nine, or as a six digit counter counting from zero to six. To this end, the outputs $s_4$ and $s_8$, on one hand, and their complements, $\bar{s}_4$ and $\bar{s}_8$, on the other hand, are connected to two sets of contacts of a change-over switch 2. The movable contact of the change-over switch to which $s_4$ and $s_8$ are connected is in turn connected to one input of an AND-gate 1. The other movable contact of the change-over switch is connected to an input of an AND-gate 3 which constitutes the routing input to the upper part of the bistable device II. When change-over switch 2 is placed in its upper position, the counter is a six digit counter. After the fourth pulse is received at input 4, device III changes its condition and blocks gate 3. Simultaneously, the input of 1 connected to the switch 2 receives the higher voltage value from the bistable device III. With the fifth pulse at the input 4 the device I has its upper lead at the higher voltage. The said lead is connected to the other input of gate 1 which consequently delivers a signal indicative of the count of the counter as an output signal $Z_1$. When the switch 2 is placed on its lower condition, the same occurs only at the application of the eighth and ninth pulses at the input 4. Of course, the switch 2 may be omitted for an unadjustable counter and, for a six count, device IV may be omitted as well as the lower input part of device III.

The output of gate 1 is applied to a polarity reversing amplifier 5 followed by a further polarity reversing amplifier 6. When the counter marks its maximum count, the voltage at the output of 6 represents $Z_1$ where as the voltage at the output of 5 represents $\bar{Z}_1$. Normally the two other counters of the stages will simultaneously or nearly simultaneously, as indicated by the graphs of FIG. 10, deliver signals $Z_2$ and $Z_3$ identical to $Z_1$. A majority function forming circuit is shown at V, comprising three AND-gates 7, 8 and 9 the outputs of which are connected in common to the input of an amplifier 10 (delivering the complement $\bar{Z}_M$ of the majority signal) which is followed by a further amplifier 11, delivering as an output the majority voted signal $Z_M$. Of the three gates 7, 8 and 9, gate 7 receives the signal $Z_1$ from 6 and $Z_2$ from an input 22; gate 8 receives the signal $Z_1$ from 6 and $Z_3$ from an input 23; and gate 9 receives the signals $Z_2$ and $Z_3$ from terminals 22 and 23. The union of the gate outputs conforms to relation (i) supra. The majority signal $Z_M$ is routed to the output connection 12 for acting as an input signal to the input terminal of the corresponding counter in the next stage of the system. An output connection 13 is also provided for delivering the signal $Z_1$ to the other majority function forming circuits of the concerned stage.

A signal is derived from $Z_M$ to reset the counter to zero. For this purpose the signal $Z_M$ is applied through a buffer stage 18 and a series connected driving transformer 19, to a one shot trigger circuit 20 to activate same. As the device 20 returns to rest a pulse is derived which is successively applied to the stages I to IV of the counter through small delays 21. The signals at 19, 20 and 21 are shown in FIG. 10. The pulses are applied as resetting pulses to the bistable devices of the counter which is thereby reset such that it is ready for a new counting cycle.

The "minority" signal or the dissenting vote of the operator is here made by comparing the output signal $Z_1$ of the counter to the majority signal $Z_M$ in a circuit VI made in accordance to the well known restrictive-OR process. It comprises two AND-gates, 14 and 15 the outputs of which are connected to a lead 17 and to the signalling device (not shown). Gate 14 receives the signals $Z_1$ and $\bar{Z}_M$, gate 15 receives $\bar{Z}_1$ and $Z_M$. The circuit operates according to relation (ii) supra. As a risk of erroneous signalling exists due to the slightly shifted time instants whereat the signals $Z_1$, $Z_2$ and $Z_3$ occur, gates 14 and 15 are solely enabled by the pulses of a series of pulses 16 applied at the terminal of same number in FIG. 9, so that the circuit cannot operate during the occurrence of the various signals Z or the disappearance thereof.

I claim:

1. An information handling system for processing binary data items including at least first and second stages of triplicated operators and a majority voter gate circuit connecting the outputs of said first stage to the inputs of said second stage, and comparator means including at least two distinct logic members operatively connected to the outputs of said first stage for comparing the output signals from said operators to produce signals indicative of dissenting votes by one operator relative to the other operators of said stage which signals are also individually indicative of the operator producing said dissenting vote.

2. A system according to claim 1 wherein each of said logic members is operatively connected on its input side to at least two of said operators.

3. An information handling system for processing binary data items including at least first and second stages of triplicated operators and a majority voter gate circuit connecting the outputs of said first stage to the inputs of said second stage, and comparator means including at least three distinct logic members operatively connected to the outputs of said first stage for comparing the output signals from said operators to produce signals indicative of dissenting votes by one operator relative to the other operators of said stage which signals are also individually indicative of the operator producing said dissenting vote.

4. A system according to claim 3 wherein each of said logic members is operatively connected on its input side to at least two of said operators.

5. A system according to claim 3 wherein each of said logic members is provided with two inputs, one of which is selectively connected to the outputs of said first stage operators and the other of which is connected to the output of said majority voter gate circuit.

6. A system according to claim 3 wherein each of said logic members comprises a minority forming circuit, and wherein each of said minority forming circuits is connected on the input side to the output side of each of the operators of said first stage.

7. A system according to claim 3 wherein circuit means are operatively connected to said first stage, said majority gate circuit and to said comparator to automatically replace a malfunctioning circuit in response to a signal indicative of same.

8. A system according to claim 3 wherein circuit means are operatively connected to said majority voter circuit and to an operator in said first stage to produce a reset signal for said operator.

References Cited

UNITED STATES PATENTS 3,226,569  12/1965  James _____ 340—146.1 X
3,228,001  1/1966  Herzl _____ 340—146.1 X

OTHER REFERENCES

Brown et al: "Development of Electronic-Computer Reliability Through the Use of Redundancy," IRE Transactions on Electronic Computers, September 1961, p. 407 and 410.

Lyons et al: "The Use of Triple-Modular Redundancy To Improve Computer Reliability," IBM Journal of Research & Development, April 1962, p. 200 and 201.

MALCOLM A. MORRISON, *Primary Examiner.*

M. J. SPIVAK, V. SIBER, *Assistant Examiners.*